United States Patent Office 3,091,616
Patented May 28, 1963

3,091,616
1-ORTHO-TOLYLOXYETHYL-4-PHENYLPIPERI-DINE AND ACID ADDITION SALTS THEREOF
Vladimir Petrow, Oliver Stephenson, and Alan Jeffery Thomas, London, England, assignors to The British Drug Houses Limited, London, England, a British company
No Drawing. Filed July 18, 1960, Ser. No. 43,289
Claims priority, application Great Britain July 20, 1959
3 Claims. (Cl. 260—294)

This invention is for improvements in or relating to organic compounds.

It is an object of the present invention to provide the new compound, 1-o-tolyloxyethyl-4-phenylpiperidine having the Formula I

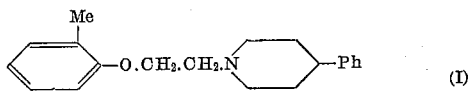

(I)

and its non-toxic pharmaceutically acceptable salts with mineral and organic acids, in particular the hydrochloride and tartrate which are of value on account of their hypotensive properties.

According to the present invention there is provided a process for the preparation of 1-o-tolyloxyethyl-4-phenyl-piperidine which process comprises subjecting a 2-o-tolyl-oxyethyl halide

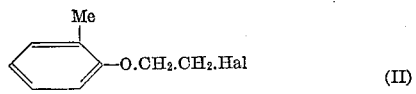

(II)

and 4-phenyl-1,2,3,6-tetrahydropyridine

(III)

to the steps of condensation and hydrogenation.

The operations of condensation and hydrogenation, as will be apparent to those skilled in the art, may be performed in optional order.

Thus, for example, a 2-o-tolyloxyethyl halide (II) may be condensed with 4-phenyl-1,2,3,6-tetrahydropyridine (III) to yield 1-o-tolyloxyethyl-4-phenyl-1,2,3,6-tetrahydropyridine (IV)

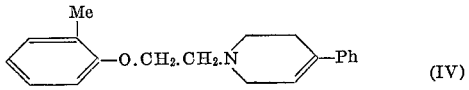

(IV)

which may then be hydrogenated to yield the desired piperidino derivative (I). Alternatively the 4-phenyl-1,2,3,6-tetrahydropyridine (III) may be initially hydrogenated to 4-phenylpiperidine

(V)

which may then be condensed with the 2-o-tolyloxyethyl halide (II) to give the desired product (I).

In carrying out the process of the invention according to the route, (II)+(III)→(IV)→(I) the intermediate 1-o-tolyloxyethyl-4-phenyl-1,2,3,6-tetrahydroxypyridine (IV) may be prepared by reaction of 2-o-tolyloxyethyl bromide (II; Hal=Br) with 4-phenyl-1,2,3,6-tetrahydropyridine (III) in ethanolic solution in the presence of a slight excess of sodium carbonate. The reaction can also be carried out using 2-o-tolyloxyethyl chloride (II; Hal=Cl) or 2-o-tolyloxyethyl iodide (II; Hal=I) in place of the bromide using solvents other than ethanol, for example methanol, isopropanol, n-butanol, tert.-butanol or benzene. In place of sodium carbonate other basic compounds may be used, for example sodium hydroxide, potassium hydroxide and potassium carbonate.

The reaction is most conveniently carried out by heating the components on the steam-bath, with mechanical stirring if desired, for up to 6 hours.

1-o-tolyloxyethyl-4-phenyl-1,2,3,6-tetrahydropyridine is then isolated by methods known to those skilled in the art. For example, when alcohols are used as solvents, the bulk of the solvent may be distilled off, the residue diluted with water and the product obtained by extraction with chloroform or other suitable solvent, for example ether or benzene. When benzene or other water-immiscible solvents are used in the reaction it is only necessary to wash the solvent with water to remove inorganic material, when the product is obtained by concentration of the solvent. The product may, if required, be purified by distillation at reduced pressure when it is obtained as an almost colourless, viscous oil.

The 1-o-tolyloxyethyl-4-phenyl-1,2,3,6-tetrahydropyridine (IV) so obtained may be converted to 1-o-tolyloxyethyl-4-phenyl piperidine (I) by hydrogenation in the presence of a suitable catalyst, a 5% mixture of palladium oxide on barium carbonate having been found to be particularly convenient for this purpose. The product so obtained may be purified by distillation at reduced pressure. Alternatively, the crude product from the hydrogenation may be converted directly to a suitable salt, for example the hydrochloride or the tartrate.

In carrying out the process of the invention by the alternative route [(III)→(V); (V)+(II)→(I)] the 4-phenylpiperidine (V) is prepared by hydrogenation of 4-phenyl-1,2,3,6-tetrahydropyridine in ethtanol, or other suitable solvent, using for example, 5% palladium on charcoal or 5% palladium on barium carbonate as catalyst. 2-o-tolyloxyethyl bromide (II; Hal=Br) may then be reacted with the 4-phenylpiperidine in ethanolic solution in the presence of sodium carbonate or other dehydrohalogenating agent as described earlier for the condensation of 2-o-tolyloxyethyl bromide with 4-phenyl-1,2,3,6-tetrahydropyridine. The 1-o-tolyloxyethyl-4-phenylpiperidine (I) obtained by this route may be purified by distillation at reduced pressure or alternatively may be converted directly to a crystalline salt, for example the hydrochloride or tartrate, as mentioned earlier. These salts may be readily prepared by treating 1-o-tolyloxyethyl-4-phenylpiperidine (I) in ethanolic solution with one equivalent of the appropriate acid in ethanolic solution when the salt crystallises on cooling or may be obtained by concentration and/or dilution of the solution with a suitable solvent, for example anhydrous ether.

The compound may be administered orally in the form of tablets, elixirs or capsules which route of administration is preferred. It may also be administered by injection if so desired.

Following is a description by way of examples of methods of carrying the invention into effect.

EXAMPLE 1

*1-o-Tolyloxyethyl-4-Phenylpiperidine*

(a) 1-o-tolyloxyethyl-4-phenyl-1,2,3,6-tetrahydropyridine: A mixture of 2-o-tolyloxyethyl bromide (43 g.), 4-phenyl-1,2,3,6-tetrahydropyridine (34 g.) and anhydrous sodium carbonate (12 g.) in ethanol (250 ml.) was heated at reflux temperature for 6 hours. The mixture was cooled, diluted with water (300 ml.) and the oil isolated by extraction with chloroform. After removal of the chlorofrom the residual oil was distilled at reduced pressure to yield the product as a viscous oil.

(b) A portion of the foregoing oil (8.2 g.) was dissolved in ethanol (50 ml.), 5% palladium oxide on barium carbonate catalyst (1.0 g.) added and the mixture hydrogenated at room temperature. Absorption of hydrogen was complete in about 4 hours. The mixture was filtered to remove catalyst and the solid washed on the filter with a little ethanol. The combined filtrate and washings were concentrated and the residual oil distilled at reduced pressure to yield the 1-o-tolyloxyethyl-4-phenylpiperidine as a viscous oil.

EXAMPLE 2

*1-o-Tolyloxyethyl-4-Phenylpiperidine Hydrochloride*

The crude base, prior to distillation, obtained as described in Example 1(b), was dissolved in a minimum of ethanol and treated with a slight excess of a solution of hydrogen chloride in ethanol. The solution was diluted with ether and left to crystallise for some hours. The product separated in small, white needles and had M.P. 198 to 200° C. after crystallisation from a small amount of ethanol.

EXAMPLE 3

*1-o-Tolyloxyethyl-4-Phenylpiperidine*

(a) 4-phenylpiperidine: A solution of 4-phenyl-1,2,3,6-tetrahydropyridine (70 g.) in ethanol (150 ml.) containing 5 per cent palladium oxide on barium carbonate catalyst (10 g.) was hydrogenated at room temperature for about 4 hours when theoretical absorption of hydrogen was complete. The catalyst was filtered off, washed with a little ethanol and the combined filtrate and washings concentrated. The residual oil was distilled at reduced pressure to yield the product, B.P. 71 to 78° C. at 0.3 mm. It had M.P. 60 to 62° C.

(b) A mixture of 2-o-tolyloxyethyl bromide (66 g.), 4-phenylpiperidine (50 g.) and anhydrous sodium carbonate (20 g.) in ethanol (220 ml.) was heated at reflux temperature for 6 hours. The mixture was cooled, diluted with water (300 ml.) and extracted with three 150 ml. portions of chloroform. The combined chloroform extracts were washed with water, the chloroform removed by distillation and the residual oil distilled at 0.1 mm. 1-o-tolyloxyethyl-4-phenylpiperidine was obtained as viscous oil.

EXAMPLE 4

*1-o-Tolyloxyethyl-4-Phenylpiperidine Tartrate*

1-o-tolyloxyethyl-4-phenylpiperidine (22.2 g.), prepared as described in Example 3, was dissolved in ethanol (30 ml.) heated to near boiling and treated with a hot solution of tartaric acid (11.3 g.) in ethanol (30 ml.). The tartrate salt crystallised readily on cooling. It was purified by crystallisation from absolute ethanol forming hard white crystals of M.P. 140° to 142° C.

We claim:
1. 1-ortho-tolyloxyethyl-4-phenylpiperidine.
2. 1-ortho-tolyloxyethyl-4-phenylpiperidine hydrochloride.
3. 1-ortho-tolyloxyethyl-4-phenylpiperidine tartrate.

References Cited in the file of this patent

UNITED STATES PATENTS

| | | |
|---|---|---|
| 2,479,815 | Craig | Aug. 23, 1949 |
| 2,784,192 | Schmidle et al. | Mar. 5, 1957 |
| 2,918,470 | Krapcho et al. | Dec. 22, 1959 |

OTHER REFERENCES

Brill: Journal of the American Chemical Society, volume 47, page 1135 (1925)